(12) United States Patent
Cisternino et al.

(10) Patent No.: US 6,224,129 B1
(45) Date of Patent: May 1, 2001

(54) CAR SEAT TETHER ANCHOR AND SYSTEM

(75) Inventors: Franco A. Cisternino, Highwood; Kenneth R. LeVey, West Chicago; Eric G. Parker, Winnetka, all of IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/613,974

(22) Filed: Jul. 11, 2000

(51) Int. Cl.[7] .................................................. B60R 22/00
(52) U.S. Cl. ................................. 296/65.03; 280/801.1; 297/253
(58) Field of Search ...................... 296/63, 65.01, 296/65.03; 280/801.1; 297/253, 473, 481, 482

(56) References Cited

U.S. PATENT DOCUMENTS

| Re. 32,448 | * | 6/1987 | Anderson | 280/808 |
|---|---|---|---|---|
| 2,510,115 | * | 6/1950 | Jakosky | 224/122 R |
| 3,207,552 | | 9/1965 | Loughney, Jr. | 297/37 |
| 3,922,035 | | 11/1975 | Wener | 297/250 |
| 4,103,933 | | 8/1978 | Fisher et al. | 280/744 |
| 4,909,541 | | 3/1990 | Tokugawa | 280/808 |
| 5,029,928 | * | 7/1991 | Huber | 296/63 |
| 5,280,959 | | 1/1994 | Nanbu | 280/808 |
| 5,415,430 | * | 5/1995 | Valasin | 280/801.1 |
| 5,547,222 | | 8/1996 | Schmidt | 280/801.2 |
| 5,669,663 | | 9/1997 | Feuerherdt | 297/253 |
| 5,816,651 | | 10/1998 | Feuerherdt | 297/253 |
| 5,918,934 | | 7/1999 | Siegrist | 297/250.1 |
| 5,941,601 | | 8/1999 | Scott et al. | 297/253 |
| 5,951,046 | | 9/1999 | Hosoda et al. | 280/801.2 |

* cited by examiner

Primary Examiner—D. Glenn Dayoan
Assistant Examiner—Paul Chenevert
(74) Attorney, Agent, or Firm—Lisa M. Soltis; Mark W. Croll; John P. O'Brien

(57) ABSTRACT

A car seat tether restraint system having an anchor with a fastening portion and a leg with a foot extending from a mounting side thereof, a resilient locking flange extending from the mounting side of the anchor in an opposite direction as the foot, a body panel having a locking flange recess on one side thereof and an aperture therein, the leg disposed in the aperture with a portion of the body panel disposed between the mounting side of the anchor and the foot, the locking flange disposed in the locking flange recess.

20 Claims, 1 Drawing Sheet

CAR SEAT TETHER ANCHOR AND SYSTEM

BACKGROUND OF THE INVENTION

The invention relates generally to car seat restraints, and more particularly to car seat tether anchors and restraint systems.

Aftermarket car seats, for example child booster seats and infant carriers, are generally restrained in the front and preferably the rear seat of a passenger cabin by a lap belt installed by the carriage manufacturer for passenger restraint.

Aftermarket car seats are increasingly provided with a strap or tether having a fastener for additional anchoring to some structure in the passenger cabin. See, for example, U.S. Pat. No. 3,922,035 entitled "Safety Vehicle Seat Structure".

Known car seat tether anchors include a bolt disposed through a reinforced portion of a rear deck or panel of the automobile, for example above and behind the rear car seat, to which the tether is fastened. The bolt is generally fastened to a loose nut or to a threaded opening in a plate welded to the panel.

An object of the present invention is to provide novel car seat anchors and systems that overcome problems in and improve upon the prior art.

Another object of the invention is to provide in some embodiments thereof novel car seat anchors and systems that are economical.

Another object of the invention is to provide in some embodiments thereof novel car seat tether anchors and systems having improved reliability.

A further object of the invention is to provide in some embodiments thereof novel car seat tether anchors and systems having improved anchoring performance.

Another object of the invention is to provide in some embodiments thereof novel car seat tether anchors and systems that do not require threaded bolts.

Yet another object of the invention is to provide in some embodiments thereof novel car seat tether anchors comprising a unitary member.

A further object of the invention is to provide in some embodiments thereof novel car seat tether anchors and systems that are relatively easy to install.

Another object of the invention is to provide in some embodiments thereof novel car seat tether anchors and systems that do not rattle after installation.

Another object of the invention is to provide in some embodiments thereof novel car seat tether anchors that provide an audible and/or tactile indication when installed.

Another object of the invention is to provide in some embodiments thereof novel car seat tether anchors that are securely fastened to some portion of the passenger cabin.

A more particular object of the invention is to provide in some embodiments thereof novel car seat tether anchors comprising a body member having a fastening portion thereon, a plurality of legs with corresponding feet extending from a mounting side of the body member, and a locking flange extending from the mounting side of the body member, the locking flange and feet extending toward opposite ends of the body member.

Another more particular object of the invention is to provide in some embodiments thereof novel car seat tether restraint systems comprising an anchor having a fastening portion and a leg with a foot extending from a mounting side thereof, a locking flange extending from the mounting side of the anchor in an opposite direction as the foot, a body panel having a locking flange recess on one side thereof and an aperture therein, the leg disposed in the aperture with a portion of the body panel disposed between the mounting side of the anchor and the foot, and the locking flange disposed in the locking flange recess.

Yet another more particular object of the invention is to provide in some embodiments thereof novel unitary anchor clips comprising a fastening portion on a body member, a plurality of generally L-shaped legs extending from a mounting side of the body member, each leg having a foot extending toward an end portion of the body member, and a resilient locking flange extending from the mounting side of the body member in an opposite direction as the feet.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

DETAILED DESCRIPTION OF THE INVENTION

Figure 1:
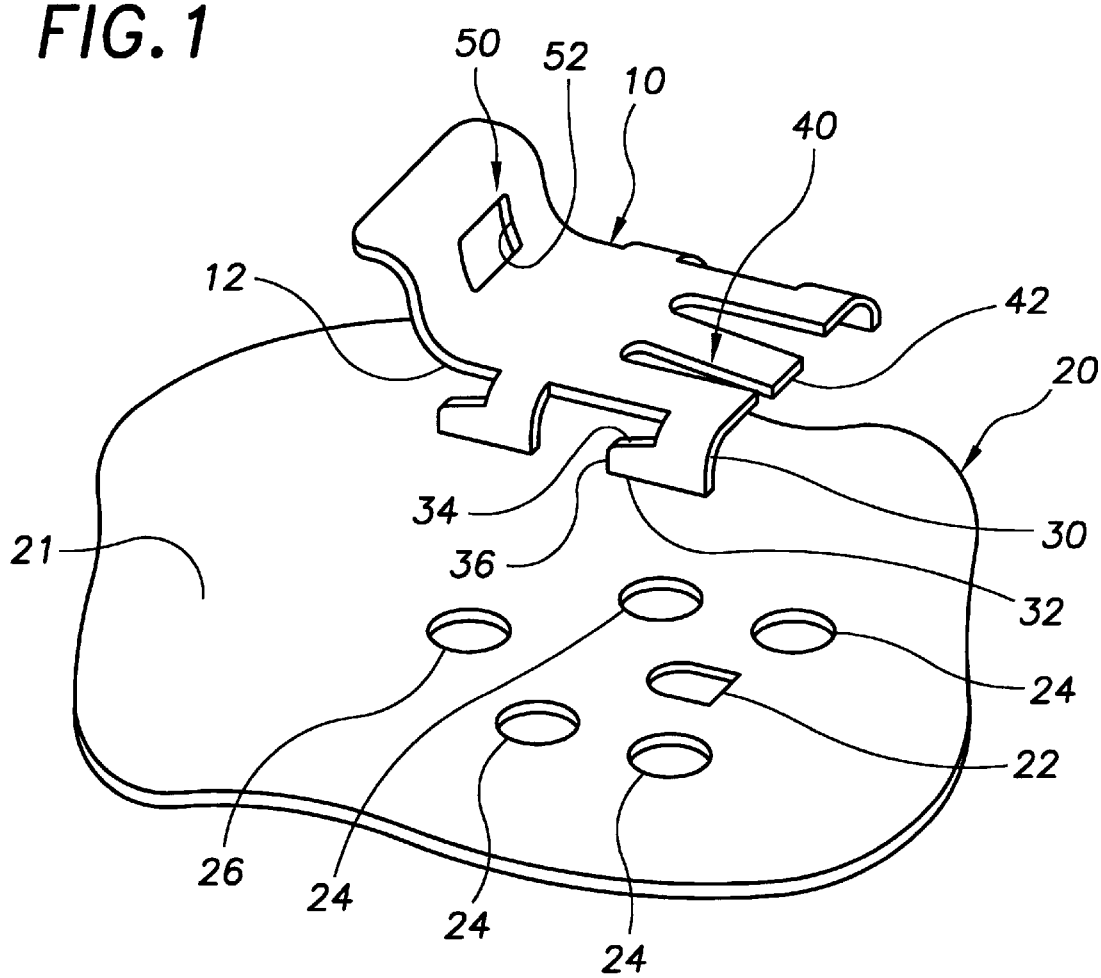
FIG. 1 is a perspective view of an unassembled car seat tether restraint system according to an exemplary embodiment of the invention.

FIG. 1 illustrates a child car seat tether restraint system comprising generally an anchor 10 mountable onto a panel 20 for anchoring a strap or tether of a car seat, not shown in the drawing, thereto. In alternative applications, the anchors and systems of the present invention may be used to fasten or anchor other straps, or some other non-strap member.

The exemplary anchor 10 comprises a body member having a mounting side with a plurality legs 30 extending therefrom, some of which are preferably disposed toward opposite lateral side portions of the body member, as illustrated best in FIG. 1.

In an alternative embodiment however the anchor may have fewer legs, for example a single leg located generally centrally on the body member. The number and size of the legs depends generally on the load bearing capacity required for a particular application, and the location of the legs depends generally on the requirements of the application.

The legs each include a foot 32 extending therefrom generally toward an end portion of the anchor, imparting to the leg a generally L-shaped configuration. In embodiments where there are a plurality of legs, the corresponding feet preferably extend in the same direction, for example toward the same end portion of the anchor.

In some embodiments, a spacing between an upper portion of the foot and the mounting side of the body member decreases from a distal end of the foot toward the corresponding leg from which the foot extends.

In FIG. 1, for example, the feet 32 extend slightly away from the mounting side of the body member, and more specifically the feet have an upper portion 34, generally opposite the mounting surface 12 of the anchor. The upper portion 34 slopes away from the mounting surface with increasing distance between the leg 30 and a distal end portion 36 of the foot, thus forming an increasingly narrowing gap between the foot and the mounting side of the anchor. Equivalent configurations include forming a sloping portion on the mounting side of the anchor, rather than on the foot, or on both the foot and the anchor.

A locking flange extends from the mounting side of the anchor in a direction generally opposite that of the one or more feet. In FIG. 1, the locking flange 40 is a resilient and flexible member with an end portion 42 extending away from the mounting side 12 of the body member toward an opposite end portion thereof as the plurality of feet.

The exemplary locking flange 40 is disposed between the legs 30 on opposite lateral side portions of the body member, but in other embodiments the locking flange may be located on other portions of the body member, so long as the locking flange locks the anchor as discussed more fully below.

A fastening portion is also disposed on the anchor and is configured for engagement with a mating fastener, which may take any number of shapes or configurations, depending upon the type of fastener with which it is assembled or to which it is mated.

In the exemplary embodiment of FIG. 1, the body member comprises a tether flange 50 extending therefrom opposite the mounting side thereof. The exemplary tether flange also extends from the end portion of the body member toward which the feet extend.

In FIG. 1, the tether fastening portion is in the form of a ring formed partly by a generally rectangular aperture 52 through the flange 50. The exemplary structure of the tether flange and the tether fastening portion thereof, however, is not intended to the limit the invention since in most applications the configuration thereof will be determined by the fastener on the car seat tether, which is provided by the car seat manufacturer.

The anchor 10 is preferably a unitary member formed of a metal material, for example in metal stamping operation, although other materials and types of manufacture may be employed alternatively.

The exemplary panel 20 of FIG. 1 is a rear seat deck of an automobile, but more generally it may be any panel, depending on the particular application. The exemplary panel comprises a locking flange recess or aperture 22 on one side 21 thereof and a plurality of apertures 24 therein, corresponding in number and location of the anchor legs. In some embodiments, the panel may also include a tool aperture 26 to facilitate installation of the anchor 10, as discussed more fully below.

Figure 2:
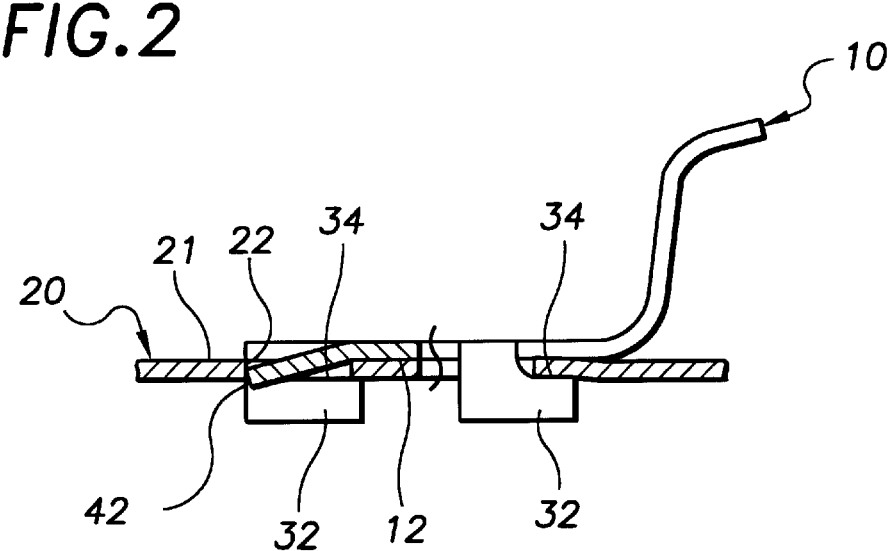
FIG. 2 illustrates sectional views of different portions of an installed car seat tether anchor.

To install the anchor, the legs thereof are disposed initially in the corresponding panel apertures. The exemplary apertures 24 are circular in shape. In other embodiments, the apertures may be elongated slots or have other shapes. Whatever the configuration, the apertures 24 are sized generally to accommodate or permit passage of the feet 32 through the panel 20, whereupon the body member is moved laterally along the panel surface in the direction of the feet until a portion of the body panel is disposed between the mounting side 12 of the anchor and the feet, and particularly the upper surfaces 34 thereof, thus capturing the panel therebetween, as illustrated in FIG. 2.

The resilient locking flange 40 is flexed toward the mounting side 12 of the body member and engaged with the panel surface 21 when the anchor is installed. The locking flange recess 22 of the body panel is located to receive the end portion 42 of locking flange when the anchor is positioned to capture portions of the panel between the mounting side of the anchor and the feet thereof, thereby locking the anchor into its mounting position, as illustrated in FIG. 2.

The resilient locking flange 40 preferably snaps into the locking flange recess 22, thus providing an audible and tactile indication that the anchor is installed.

In some embodiments, the locking flange recess is sized or located so that the resilient locking flange 40 is flexed against the surface portion 21 of the body panel after the end portion 42 of the locking flange is snapped into the locking flange recess 22, thus providing a constant bias against the body panel that reduces or eliminates any vibration or rattling of the anchor.

In some embodiments, the spacing between the upper portion 34 of the feet and the mounting side 12 of the anchor is reduced to an extent that the panel is deformed as it is wedged therebetween upon positioning the anchor until the locking flange snaps into the locking flange recess.

In some embodiments, the panel includes a tool aperture 26 to accommodate the end of a tool, for example a screw driver, used to pry the anchor into its locked position. In the exemplary embodiment, a screw driver or other tool may be disposed through the anchor aperture 52 and into the tool aperture 26 on the body panel whereupon the anchor may be moved relative to the body panel by a prying action of the tool, to engage the panel between the feet and body member, as discussed above. This method for installing the anchor is especially useful in embodiments having a tapered gap between the upper portion of the feet and the mounting surface of the anchor.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. A car seat tether anchor comprising:
   a body member having a mounting side;
   a tether fastening portion on the body member;
   a plurality of legs extending from the mounting side of the body member, the plurality of legs each having a foot, the feet extending in the same direction;
   a locking flange extending from the mounting side of the body member, the locking flange extending in a direction opposite that of the feet.

2. The anchor of claim 1, the plurality of legs disposed toward opposite lateral side portions of the body member.

3. The anchor of claim 1, a tether flange extending from the body member opposite the mounting side thereof, the tether fastening portion is on the tether flange.

4. The anchor of claim 3, the plurality of legs are disposed toward opposite lateral side portions of the body member and the locking flange is located therebetween.

5. The anchor of claim 4 is a unitary member.

6. The anchor of claim 1, a spacing between an upper portion of the plurality of feet and the mounting side of the body member decreases from a distal end of the feet toward the corresponding leg.

7. The anchor of claim 1, the locking flange is resilient.

8. A car seat tether restraint system comprising:
   an anchor having a mounting side with a leg extending therefrom, the leg having a foot extending therefrom generally toward an end portion of the anchor;
   a tether fastening portion on the anchor;

a locking flange extending from the mounting side of the anchor generally toward an opposite end portion thereof as the foot;

a panel having a locking flange recess on one side thereof and an aperture therein, the leg of the anchor disposed in the panel aperture, a portion of the panel disposed between the mounting side of the anchor and the foot of the leg, the locking flange disposed in the locking flange recess.

9. The system of claim 8, a tether flange extending from the anchor opposite the mounting side thereof, the tether fastening portion is disposed on the tether flange.

10. The system of claim 8, a plurality of legs extending from the mounting side of the anchor, the plurality of legs each having a foot extending toward the same end portion of the anchor, the plurality of legs located toward opposite lateral side portions of the anchor.

11. The system of claim 10, the locking flange is located between the plurality of legs disposed toward the opposite lateral side portions of the body member.

12. The system of claim 11, the anchor is a unitary member.

13. The system of claim 8, the locking flange recess is an aperture through the panel.

14. The system of claim 8, the panel is a rear seat deck of an automobile.

15. The system of claim 8, a narrowing gap between the foot and the mounting surface of the anchor, the portion of the panel disposed between the mounting side of the anchor and the foot is deformed.

16. The system of claim 8, the locking flange is resilient.

17. A unitary anchor clip comprising:

a body member having a mounting side;

a fastening portion on the body member;

a plurality of generally L-shaped legs extending from the mounting side of the body member, each leg having a foot extending toward an end portion of the body member;

a resilient locking flange extending from the mounting side of the body member, the locking flange extending in an opposite direction as the feet.

18. The anchor of claim 17, the plurality of legs disposed toward opposite lateral side portions of the body member, the resilient locking flange is disposed therebetween.

19. The anchor of claim 17, a flange extending from the body member opposite the mounting side thereof, the fastening portion is an aperture disposed through the flange.

20. The anchor of claim 17, each of the feet having an upper portion that slopes away from the mounting side of the body member in a direction from the corresponding leg toward a distal end portion of the corresponding foot.

* * * * *